(12) United States Patent
Gao et al.

(10) Patent No.: US 11,994,838 B1
(45) Date of Patent: May 28, 2024

(54) FIVE-AXIS LINKAGE SYNCHRONOUS TOOL PATH INTERPOLATION METHOD AND SYSTEM

(71) Applicant: GUANGDONG UNIVERSITY OF TECHNOLOGY, Guangzhou (CN)

(72) Inventors: Jian Gao, Guangzhou (CN); Guixin Zhang, Guangzhou (CN); Yuheng Luo, Guangzhou (CN); Lanyu Zhang, Guangzhou (CN); Haixiang Deng, Guangzhou (CN); Yun Chen, Guangzhou (CN); Xin Chen, Guangzhou (CN)

(73) Assignee: GUANGDONG UNIVERSITY OF TECHNOLOGY, Guangzhou (CN)

(*) Notice: Subject to any disclaimer, the term of this patent is extended or adjusted under 35 U.S.C. 154(b) by 0 days.

(21) Appl. No.: 18/583,904

(22) Filed: Feb. 22, 2024

Related U.S. Application Data

(63) Continuation of application No. PCT/CN2023/093939, filed on May 12, 2023.

(30) Foreign Application Priority Data

Dec. 14, 2022 (CN) .......................... 202211629012.1

(51) Int. Cl.
G05B 19/4103 (2006.01)

(52) U.S. Cl.
CPC ............... *G05B 19/4103* (2013.01); *G05B 2219/34169* (2013.01)

(58) Field of Classification Search
None
See application file for complete search history.

(56) References Cited

U.S. PATENT DOCUMENTS

2007/0172320 A1   7/2007  Glaesser

FOREIGN PATENT DOCUMENTS

| CN | 104635619 A | 5/2015 |
| CN | 107608313 A | 1/2018 |
| CN | 109032077 A | 12/2018 |
| CN | 112947298 A | 6/2021 |
| CN | 113433889 A | 9/2021 |
| WO | 2022027836 A1 | 2/2022 |

OTHER PUBLICATIONS

Wen Hao et al., "Analysis and Improvement of Equal-Error Approximation Algorithm for NC System", Machinery Design & Manufacture, Sep. 30, 2013, Issue 9.

*Primary Examiner* — Ryan A Jarrett

(57) ABSTRACT

A five-axis linkage synchronous tool path interpolation method and system, which utilizes the strict proportional coefficient relationship between points, control points and parameters on the first-order derivative curve of the spline curve, more accurate tool axis path curve interpolation points from the parameters of the tool tip path curve are calculated. There is no need to calculate the tool axis path curve interpolation points according to interval synchronization. It is not affected by the shape consistency of the tool tip path curve and the tool axis path curve.

8 Claims, 6 Drawing Sheets

According to the tool path information, the tool tip path curve and the tool axis path curve are respectively fitted based on the quadratic NURBS curve, and the node vectors of the tool tip path curve and the tool axis path curve are obtained respectively — 101

According to the relationship between the constraints of the CNC machine tool and the feed speed, the feed speed curve is planned — 102

According to the feed speed curve, the tool tip path curve is interpolated from the $i=0^{th}$ interpolation point, and the $i+1$th interpolation point of the tool tip path curve is calculated according to the second-order Taylor expansion formula — 103

The tool tip node vector interval is determined where the $i+1$th interpolation point of the tool tip path curve falls — 104

The tool axis node vector interval corresponding to the tool tip node vector interval on the tool axis path curve and the first-order derivative vector of the interpolation points corresponding to the left and right endpoints of the tool tip node vector interval are calculated — 105

The three first-order derivative vectors are projected onto the XOY plane and the starting point is moved to the same point. The first angle between the first-order derivative vector at the $i+1$th interpolated point of the tip path curve and the first order derivative vector at the left end of the vector interval of the tool tip node, and the second angle between the first-order derivative vector at the left end of the vector interval of the tool tip node and the first-order derivative vector at the right end of the vector interval of the tool tip node are calculated respectively in the XOY plane. The first angle is divided by the second angle to get the angle progress — 106

The first-order derivative vector of the tool axis node vector interval corresponding to the tool tip node vector interval on the tool axis path curve and the interpolation points corresponding to the left and right endpoints of the tool tip node vector interval are calculated — 107

The first-order derivative vector of the $i+1$th interpolation point of the tool axis path curve is determined according to the angular progress — 108

The intersection point of the first-order derivative vector of the $i+1$th interpolation point of the tool axis path curve and the first-order derivative curve of the tool axis path curve is calculated. The proportional coefficient is calculated according to the preset formula — 109

The $i+1$th interpolation point of the tool axis path curve linked to the $i+1$th interpolation point of the tool tip path curve is calculated based on the proportional coefficient, and the tool axis path curve is interpolated — 110

FIG. 1

FIVE-AXIS LINKAGE SYNCHRONOUS TOOL PATH INTERPOLATION METHOD AND SYSTEM

CROSS-REFERENCE TO RELATED APPLICATIONS

This application is a continuation of International Patent Application No. PCT/CN2023/093939 with a filing date of May 12, 2023, designating the United States, now pending, and further claims priority to Chinese Patent Application No. 202211629012.1 with a filing date of Dec. 14, 2022. The content of the aforementioned applications, including any intervening amendments thereto, are incorporated herein by reference.

TECHNICAL FIELD

The invention relates to the technical field of CNC machine tool control, and in particular to a five-axis linkage synchronous tool path interpolation method and system.

BACKGROUND OF THE PRESENT INVENTION

Five-axis CNC machine tools can flexibly control the tool posture through changes in the tool tip position coordinates and tool axis vector, thereby improving processing speed, accuracy and surface finish. They are widely used in fields such as power energy and aerospace. Compared with traditional linear interpolation, parametric interpolation has higher accuracy and efficiency, and it is easier to obtain a smooth feed speed curve. Therefore, curve and surface interpolation processing technology in high-end CNC systems gradually replaces traditional straight lines or arcs interpolation processing technology.

NURBS (Non Uniform Rational B-Spline) curve interpolation method is widely used in the industry due to its flexibility in fitting various different paths. The NURBS curve used in the five-axis NURBS curve interpolation calculation is divided into the tool tip NURBS curve C(u) and the tool axis NURBS curve C(v). In order to link the tool tip curve and the tool axis curve to form a tool vector, the existing technology uses the same parameter method to make the parameters of the tool axis curve the same as the parameters of the tool tip curve, that is, $v_{i+1}=u_{i+1}$. This will cause the actual direction of the tool to be different from the desired direction and affect the processing accuracy. Therefore, the existing technology also provides a method of using interval synchronization, setting the relationship between $v_{i+1}$ and $u_{i+1}$, and reducing the deviation caused by using the same parameter method. However, the interval synchronization method is extremely dependent on the shape of the tool tip NURBS curve C(u) and the tool axis NURBS curve C(v). When the shapes of the two curves are inconsistent, it will still cause the actual direction of the tool to deviate from the expected direction.

CONTENTS OF THE PRESENT INVENTION

The present invention provides a five-axis linkage synchronous tool path interpolation method and system, which is used to solve the problem that the existing five-axis NURBS curve interpolation method is prone to deviations between the actual direction of the tool and the desired direction, resulting in poor contours of the processed parts.

In view of this, the first aspect of the present invention provides a five-axis linkage synchronous tool path interpolation method, which includes:

According to the tool path information, the tool tip path curve and the tool axis path curve are respectively fitted based on the quadratic NURBS curve, and the node vectors of the tool tip path curve and the tool axis path curve are obtained respectively;

According to the relationship between the constraints of the CNC machine tool and the feed speed, the feed speed curve is planned;

According to the feed speed curve, the tool tip path curve is interpolated from the i=0th interpolation point, and the i+1th interpolation point of the tool tip path curve is calculated according to the second-order Taylor expansion formula;

The tool tip node vector interval is determined where the i+1th interpolation point of the tool tip path curve falls;

The first-order derivative vector of the i+1th interpolation point of the tool tip path curve and the first-order derivative vector of the interpolation point corresponding to the left and right endpoints of the tool tip node vector interval are calculated;

The three first-order derivative vectors are projected onto the X0Y plane and the starting point is moved to the same point. The first angle between the first-order derivative vector at the i+1th interpolated point of the tip path curve in the X0Y plane and the first order derivative vector at the left end of the vector interval of the tool tip node, and the second angle between the first-order derivative vector at the left end of the vector interval of the tool tip node and the first-order derivative vector at the right end of the vector interval of the tool tip node are calculated respectively in the X0Y plane. The first angle is divided by the second angle to get the angle progress;

The tool axis node vector interval corresponding to the tool tip node vector interval on the tool axis path curve and the first-order derivative vector of the interpolation points corresponding to the left and right endpoints of the tool tip node vector interval are calculated.

The first-order derivative vector of the i+1th interpolation point of the tool axis path curve is determined according to the angular progress;

The intersection point of the first-order derivative vector of the i+1th interpolation point of the tool axis path curve and the first-order derivative curve of the tool axis path curve is calculated. The proportional coefficient is calculated according to the preset formula, which is:

$$\eta_2 = \frac{|QC'(V_k)|}{|C'(V_k)C'(V_{k+1})|}$$

Among them, $\eta_2$ is the proportional coefficient, $V_k$ is the left end point of the tool tip node vector interval, $V_{k+1}$ is the right end point of the tool tip node vector interval, Q is the intersection point of the first-order derivative vector of the i+1th interpolation point of the tool axis path curve and the first-order derivative curve of the tool axis path curve, $C'(V_k)$ is the first-order derivative vector of the interpolation point corresponding to the left end point of the vector interval of the tool tip node, and $C'(V_{k+1})$ is the first-order derivative vector of the interpolation point corresponding to the right end point of the vector interval of the tool tip node;

The i+1th interpolation point of the tool axis path curve linked to the i+1th interpolation point of the tool tip path curve is calculated based on the proportional coefficient, and the tool axis path curve is interpolated.

Optionally, the formula for calculating the first-order derivative vector of the i+1th interpolation point of the tool tip path curve and the first-order derivative vector of the interpolation point corresponding to the left and right endpoints of the vector interval of the tool tip node is:

$$C'(u) = \frac{\sum_{j=0}^{n} N'_{j,p}(u) w_j P_j - C(u) \cdot \sum_{j=0}^{n} N'_{j,p}(u) w_j}{\sum_{j=0}^{n} N_{j,p}(u) w_j}$$

Among them, $C'(u)$ is the first-order derivative curve of the tool tip path curve $C(u)$, $N_{j,p}(u)$ is the B-spline basis function of degree p defined by the node vector of the tool tip path curve, $N_{j,p}'(u)$ is the first-order derivative of $N_{j,p}(u)$, $P_j$ is the jth control point, $w_j$ and is the jth weight coefficient, n is the number of control points.

Optionally, the calculation formula for calculating the i+1th interpolation point of the tool axis path curve linked to the i+1th interpolation point of the tool tip path curve based on the proportional coefficient is:

$$v_{i+1} = V_k + \eta_2(V_{k+1} - V_k)$$

Among them, $v_{i+1}$ is the i+1th interpolation point of the tool axis path curve.

Optionally, the constraints of the CNC machine tool include sampling point speed constraints, centripetal acceleration constraints, centripetal jerk constraints, chord error constraints and contour error constraints;

The sampling point speed constraint is:

$$f_{p,max} = \min\{f_{t,max}, K_1^-(v_{\wedge,max}), K_1^-(K_2^-(v_{\vee,max}))\}$$

Among them, $f_{p,max}$ is the maximum sampling speed, $f_{t,max}$ is the maximum feed speed determined by the performance of the CNC machine tool, $v_{\wedge,max}$ is the maximum speed of the axis, $v_{\vee,max}$ is the maximum speed of the motor, $K_1^-$ is the inverse kinematic transformation from the tool tip to the axis, $K_2^-$ and is the inverse kinematic transformation from the axis to the motor;

The centripetal acceleration constraint is:

$$f_{n,a} = \sqrt{\rho a_{n,max}}$$

Among them, $f_{n,a}$ is the centripetal acceleration, $a_{n,max}$ is the maximum centripetal acceleration, $\rho$ is the curvature of the path curve;

The centripetal jerk constraint is:

$$f_{n,j} = \sqrt[3]{\rho^2 j_{n,max}}$$

Among them, $f_{n,j}$ is the centripetal jerk and $j_{n,max}$ is the maximum centripetal jerk;

The chord error constraint is:

$$f_{chrd} = \frac{2}{T_s} \sqrt{\rho^2 - (\rho - \delta_{max})^2}$$

Among them $f_{chrd}$ is the maximum speed constrained by the chord error, $T_s$ is the interpolation period, and $\delta_{max}$ is the maximum chord error;

The contour error constraint is:

$$f_{cntr} = \rho \omega_n \sqrt{1 - 2\xi^2 + \sqrt{(2\xi^2 - 1)^2 - \frac{\varepsilon_{max}^2 - 2\varepsilon_{max}\rho}{(\rho - \varepsilon_{max})^2}}}$$

Among them, $f_{cntr}$ is the maximum speed constrained by the contour error, $\varepsilon_{max}$ is the maximum contour error, $\omega_n$ is the natural frequency of the CNC machine tool system, and $\xi$ is the damping of the CNC machine tool system.

Optionally, according to the relationship between the constraints of the CNC machine tool and the feed speed, the feed speed curve is planned.

According to the relationship between the constraints and feed speed of the CNC machine tool, the maximum feed speed that satisfies the constraints at each sampling point is calculated, where the maximum feed speed that satisfies the constraints at each sampling point is:

$$f(u_i) = \min\{f_{p,max}^i, f_{n,a}^i, f_{n,j}^i, f_{chrd}^i, f_{cntr}^i\}$$

Among them, $f(u_i)$ is the maximum feed speed that satisfies the constraint condition at the ith sampling point, $f_{p,max}^i$ is the maximum sampling speed that satisfies the sampling point speed constraint at the ith sampling point, $f_{n,a}^i$ is the centripetal acceleration that satisfies the centripetal acceleration constraint at the ith sampling point. $f_{n,j}^i$ is the centripetal jerk that satisfies the centripetal jerk constraint at the ith sampling point, $f_{chrd}^i$ is the maximum speed at the ith sampling point that satisfies the chord error constraint, and $f_{cntr}^i$ is the maximum speed at the ith sampling point that satisfies the contour error constraint.

According to the maximum feed speed that satisfies the constraint conditions at all sampling points, polynomial fitting is used to obtain the feed speed curve that satisfies the constraint conditions along the entire curve path.

The second aspect of the invention also provides a five-axis linkage synchronous tool path interpolation system, which includes:

A curve fitting module is used to fit the tool tip path curve and the tool axis path curve based on the quadratic NURBS curve according to the tool path information respectively, and the node vectors of the tool tip path curve and the tool axis path curve are obtained respectively;

A speed planning module is used to plan the feed speed curve based on the relationship between the constraints of the CNC machine tool and the feed speed;

A tool tip curve interpolation point calculation module is used to interpolate the tool tip path curve from the i=0th interpolation point based on the feed speed curve, and calculate the i+1th interpolation point of the tool tip path curve based on the second-order Taylor expansion formula;

A tool tip node vector interval judgment module is used to judge the tool tip node vector interval where the i+1th interpolation point of the tool tip path curve falls;

A first-order derivative vector calculation module of the tool tip interpolation point is used to calculate the first-order derivative vector of the i+1th interpolation point of the tool tip path curve and the first-order derivative vector of the interpolation point corresponding to the left and right endpoints of the vector interval of the tool tip node;

An angular progress calculation module is used to project three first-order derivative vectors onto the X0Y plane, and move the starting point to the same point. The first angle between the first-order derivative vector at the i+1th interpolated point of the tip path curve in the X0Y plane and the first order derivative vector at the left end of the vector interval of the tool tip node, and the second angle between the first-order derivative vector at the left end of the vector interval of the tool tip node and the first-order derivative vector at the right end of the vector interval of the tool tip node are calculated respectively in the X0Y plane. The first angle is divided by the second angle to get the angle progress;

A first-order derivative vector calculation module of the first tool axis interpolation point is used to calculate the first-order derivatives vector of the vector interval of the tool axis node corresponding to the vector interval of the tool tip node on the tool axis path curve and the interpolation points corresponding to the left and right endpoints of the vector interval of the tool tip node;

A first-order derivative vector calculation module of the second tool axis interpolation point is used to determine the first-order derivative vector of the i+1th interpolation point of the tool axis path curve based on the angular progress;

A proportional coefficient calculation module is used to calculate the intersection point of the first-order derivative vector of the i+1th interpolation point of the tool axis path curve and the first-order derivative curve of the tool axis path curve. The proportional coefficient is calculated according to the preset formula, which is:

$$\eta_2 = \frac{|QC'(V_k)|}{|C'(V_k)C'(V_{k+1})|}$$

Among them, $\eta_2$ is the proportional coefficient, $V_k$ is the left end point of the tool tip node vector interval, $V_{k+1}$ is the right end point of the tool tip node vector interval, Q is the intersection point of the first-order derivative vector of the i+1th interpolation point of the tool axis path curve and the first-order derivative curve of the tool axis path curve, $C'(V_k)$ is the first-order derivative vector of the interpolation point corresponding to the left end point of the vector interval of the tool tip node, and $C'(V_{k+1})$ is the first-order derivative vector of the interpolation point corresponding to the right end point of the vector interval of the tool tip node;

A tool axis curve interpolation point calculation module is used to calculate the i+1th interpolation point of the tool axis path curve linked to the i+1th interpolation point of the tool tip path curve based on the proportional coefficient, and the tool axis path curve is interpolated.

Optionally, the formula for calculating the first-order derivative vector of the i+1th interpolation point of the tool tip path curve and the first-order derivative vector of the interpolation point corresponding to the left and right endpoints of the vector interval of the tool tip node is:

$$C'(u) = \frac{\sum_{j=0}^{n} N'_{j,p}(u)w_j P_j - C(u) \cdot \sum_{i=0}^{n} N'_{j,p}(u)w_j}{\sum_{j=0}^{n} N_{j,p}(u)w_j}$$

Among them, $C'(u)$ is the first-order derivative curve of the tool tip path curve $C(u)$, $N_{j,p}(u)$ is the B-spline basis function of degree p defined by the node vector of the tool tip path curve, $N'_{j,p}(u)$ is the first-order derivative of $N_{j,p}(u)$, $P_j$ is the jth control point, $w_j$ and is the jth weight coefficient, n is the number of control points.

Optionally, the calculation formula for calculating the i+1th interpolation point of the tool axis path curve linked to the i+1th interpolation point of the tool tip path curve based on the proportional coefficient is:

$$v_{i+1} = V_k + \eta_2(V_{k+1} - V_k)$$

Among them, $v_{i+1}$ is the i+1th interpolation point of the tool axis path curve.

Optionally, the constraints of the CNC machine tool include sampling point speed constraints, centripetal acceleration constraints, centripetal jerk constraints, chord error constraints and contour error constraints;

The sampling point speed constraint is:

$$f_{p,max} = \min\{f_{t,max}, K_1^-(v_{\wedge,max}), K_1^-(K_2^-(v_{\vee,max}))\}$$

Among them, $f_{p,max}$ is the maximum sampling speed, $f_{t,max}$ is the maximum feed speed determined by the performance of the CNC machine tool, $v_{\wedge,max}$ is the maximum speed of the axis, $v_{\vee,max}$ is the maximum speed of the motor, $K_1^-$ is the inverse kinematic transformation from the tool tip to the axis, $K_2^-$ and is the inverse kinematic transformation from the axis to the motor;

The centripetal acceleration constraint is:

$$f_{n,a} = \sqrt{\rho a_{n,max}}$$

Among them, $f_{n,a}$ is the centripetal acceleration, $a_{n,max}$ is the maximum centripetal acceleration, $\rho$ and is the curvature of the path curve;

The centripetal jerk constraint is:

$$f_{n,j} = \sqrt[3]{\rho^2 j_{n,max}}$$

Among them, $f_{n,j}$ is the centripetal jerk and $j_{n,max}$ is the maximum centripetal jerk;

The chord error constraint is:

$$f_{chrd} = \frac{2}{T_s}\sqrt{\rho^2 - (\rho - \delta_{max})^2}$$

Among them $f_{chrd}$ is the maximum speed constrained by the chord error, $T_s$ is the interpolation period, and $\delta_{max}$ is the maximum chord error;

The contour error constraint is:

$$f_{cntr} = \rho\omega_n\sqrt{1 - 2\xi^2 + \sqrt{(2\xi^2 - 1)^2 - \frac{\varepsilon_{max}^2 - 2\varepsilon_{max}\rho}{(\rho - \varepsilon_{max})^2}}}$$

Among them, $f_{cntr}$ is the maximum speed constrained by the contour error, $\varepsilon_{max}$ is the maximum contour error, $\omega_n$ is the natural frequency of the CNC machine tool system, and $\xi$ is the damping of the CNC machine tool system.

Optionally, the speed planning module is specifically used for:

According to the relationship between the constraints and feed speed of the CNC machine tool, the maximum feed speed that satisfies the constraints at each sampling point is calculated, where the maximum feed speed that satisfies the constraints at each sampling point is:

$$f(u_i) = \min\{f_{p,max}^i, f_{n,a}^i, f_{n,j}^i, f_{chrd}^i, f_{cntr}^i\}$$

Among them, $f(u_i)$ is the maximum feed speed that satisfies the constraint condition at the ith sampling point, $f_{p,max}^i$ is the maximum sampling speed that satisfies the sampling point speed constraint at the ith sampling point, $f_{n,a}^i$ and is the centripetal acceleration constraint that satisfies the centripetal acceleration constraint at the ith sampling point, $f'_{n,j}$ is the centripetal acceleration at the ith sampling point that satisfies the centripetal acceleration constraint, $f'_{chrd}$ is the maximum speed at the ith sampling point that satisfies the chord error constraint, and $f'_{cntr}$ is the maximum speed at the ith sampling point that satisfies the contour error constraint;

According to the maximum feed speed that satisfies the constraint conditions at all sampling points, polynomial fitting is used to obtain the feed speed curve that satisfies the constraint conditions along the entire curve path.

It can be seen from the above technical solutions that the five-axis linkage synchronous tool path interpolation method and system provided by the present invention have the following advantages:

The five-axis linkage synchronous tool path interpolation method provided by the present invention first plans the feed speed curve, calculates the interpolation points of the tool tip path curve based on the second-order Taylor expansion formula, and then calculates the first-order derivative vector of the corresponding interpolation point based on the vector interval of the tool tip node where the interpolation point of the tool tip path curve falls. Thus, the angular progress is calculated, and the first-order derivative vector of the interpolation point of the tool axis path curve is determined based on the angular progress, and the proportional coefficient relationship of the first-order derivative curve of the tool axis path curve is obtained. The method utilizes the strict proportional coefficient relationship between points, control points and parameters on the first-order derivative curve of the spline curve, more accurate tool axis path curve interpolation points from the parameters of the tool tip path curve are calculated. There is no need to calculate the tool axis path curve interpolation points according to interval synchronization. It is not affected by the shape consistency of the tool tip path curve and the tool axis path curve. This avoids the deviation between the actual direction of the tool and the desired direction, and solves the technical problem that the existing five-axis NURBS curve interpolation method is prone to deviations between the actual direction of the tool and the desired direction, resulting in poor contours of the processed parts.

The five-axis linkage synchronous tool path interpolation system provided by the present invention is used to execute the five-axis linkage synchronous tool path interpolation method provided by the present invention. Its principle and achieved technical effects are the same as those of the five-axis linkage synchronous tool path interpolation method provided by the present invention and will not be repeated here.

DESCRIPTION OF THE DRAWINGS

FIG. 1 is a schematic flow chart of a five-axis linkage synchronous tool path interpolation method provided in an embodiment of the present invention;

DETAILED DESCRIPTION OF PREFERRED EMBODIMENTS

Figure 2:
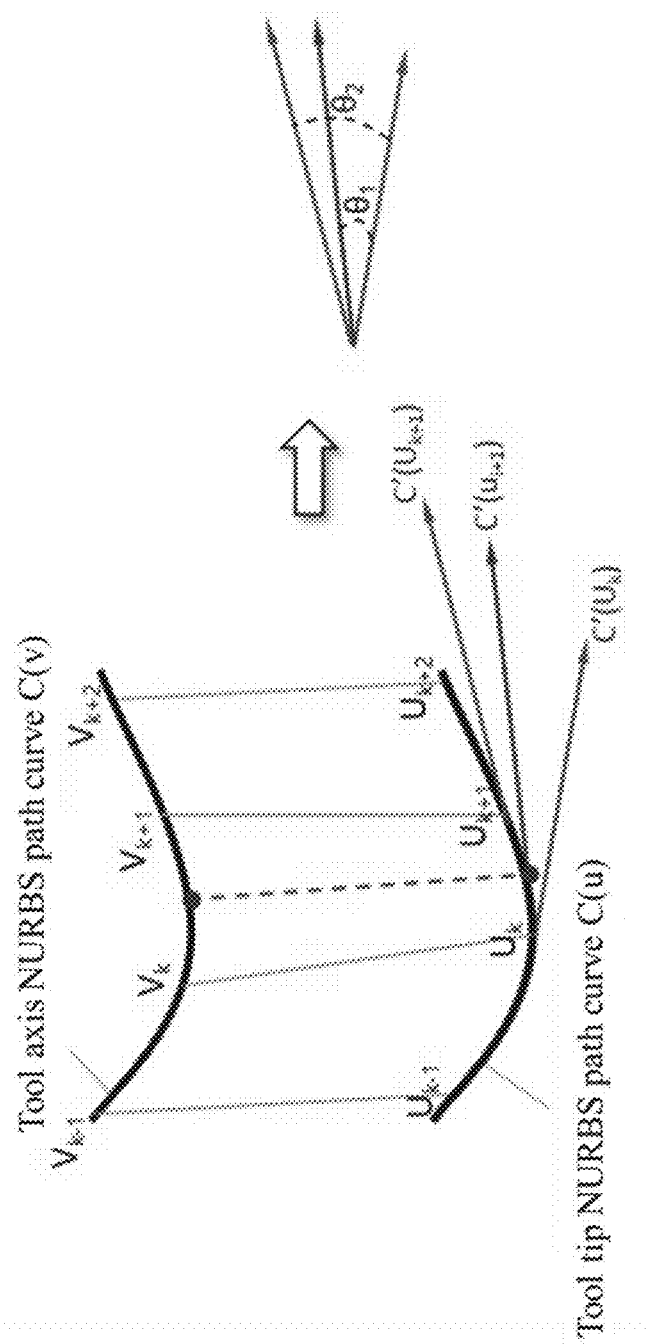
FIG. 2 is a schematic projection diagram of angular progress calculation of a five-axis linkage synchronous tool path interpolation method provided in an embodiment of the present invention.

In order to enable those skilled in the art to better understand the solutions of the present invention, the technical solutions in the embodiments of the present invention will be clearly and completely described below in conjunction with the accompanying drawings in the embodiments of the present invention. Obviously, the described embodiments are only some embodiments of the present invention, rather than all embodiments. Based on the embodiments of the present invention, all other embodiments obtained by those of ordinary skill in the art without creative efforts fall within the scope of protection of the present invention.

For ease of understanding, please refer to FIG. 1. The present invention provides an embodiment of a five-axis linkage synchronous tool path interpolation method, which includes:

Step 101: According to the tool path information, the tool tip path curve and the tool axis path curve are respectively fitted based on the quadratic NURBS curve, and the node vectors of the tool tip path curve and the tool axis path curve are obtained respectively;

It should be noted that when a part needs to be processed, the control end of the CNC machine tool will first read the tool path information for processing the part: $(x_n, y_n, z_n)$, $(x_2, y_2, z_2)$, . . . , $(x_1, y_1, z_1)$. According to the tool path information, quadratic NURBS curves are used to fit the tool tip path curve $C(u)=(x(u), y(u), z(u))$ and the tool axis path curve $C(v)=(x(v), y(v), z(v))$ respectively. u and v are the parameters of the tool tip path curve and the tool axis path curve respectively, where $0 \leq u \leq 1$, $0 \leq v \leq 1$, the node vector of the tool tip path curve $[0, 0, 0, U_1, U_2, U_3, \ldots, U_n, 1, 1, 1]$ and the node vector of the tool axis path curve $[0, 0, 0, V_1, V_2, V_3, \ldots, V_n, 1, 1, 1]$ can be obtained respectively.

Step 102: According to the relationship between the constraints of the CNC machine tool and the feed speed, the feed speed curve is planned;

It should be noted that according to the relationship between the constraints of the CNC machine tool and the feed speed, a feed speed curve f(u) that satisfies the constraints s planned. Specifically, it includes sampling point speed constraints, centripetal acceleration constraints, centripetal jerk constraints, chord error constraints and contour error constraints.

The sampling point speed constraint is:

$$f_{p,max} = \min\{f_{t,max}, K_1^-(v_{\wedge,max}), K_1^-(K_2^-(v_{\vee,max}))\}$$

Among them, $f_{p,max}$ is the maximum sampling speed, $f_{t,max}$ is the maximum feed speed determined by the performance of the CNC machine tool, $v_{\wedge,max}$ is the maximum speed of the axis, $v_{\vee,max}$ is the maximum speed of the motor, $K_1^-$ is the inverse kinematic transformation from the tool tip to the axis, $K_2^-$ and is the inverse kinematic transformation from the axis to the motor;

The centripetal acceleration constraint is:

$$f_{n,a}=\sqrt{\rho a_{n,max}}$$

Among them, $f_{n,a}$ is the centripetal acceleration, $a_{n,max}$ is the maximum centripetal acceleration, $\rho$ and is the curvature of the path curve;

The centripetal jerk constraint is:

$$f_{n,j}=\sqrt[3]{\rho^2 j_{n,max}}$$

Among them, $f_{n,j}$ is the centripetal jerk and $j_{n,max}$ is the maximum centripetal jerk;

The chord error constraint is:

$$f_{chrd} = \frac{2}{T_s}\sqrt{\rho^2 - (\rho - \delta_{max})^2}$$

Among them, $f_{chrd}$ is the maximum speed constrained by the chord error, $T_s$ is the interpolation period, and $\delta_{max}$ is the maximum chord error;

The contour error constraint is:

$$f_{cntr} = \rho \omega_n \sqrt{1 - 2\xi^2 + \sqrt{(2\xi^2-1)^2 - \frac{\varepsilon_{max}^2 - 2\varepsilon_{max}\rho}{(\rho - \varepsilon_{max})^2}}}$$

Among them, $f_{cntr}$ is the maximum speed constrained by the contour error, $\varepsilon_{max}$ is the maximum contour error, $\omega_n$ is the natural frequency of the CNC machine tool system, and $\xi$ is the damping of the CNC machine tool system.

Therefore, the maximum feed speed that satisfies the constraints at each sampling point is:

$$f(u_i)=\min\{f_{p,max}, {}^if_{n,a}, {}^if_{n,j}, {}^if_{chrd}, {}^if_{cntr}\}$$

Among them, $f(u_i)$ is the maximum feed speed that satisfies the constraint condition at the ith sampling point, $f^i_{p,max}$ is the maximum sampling speed that satisfies the sampling point speed constraint at the ith sampling point, $f^i_{n,a}$ is the centripetal acceleration that satisfies the centripetal acceleration constraint at the ith sampling point. $f^i_{n,j}$ is the centripetal jerk that satisfies the centripetal jerk constraint at the ith sampling point, $f^i_{chrd}$ is the maximum speed at the ith sampling point that satisfies the chord error constraint, and $f^i_{cntr}$ is the maximum speed at the ith sampling point that satisfies the contour error constraint.

According to the maximum feed speed that satisfies the constraint conditions at all sampling points, polynomial fitting is used to obtain the feed speed curve that satisfies the constraint conditions along the entire curve path f(u).

Step 103: According to the feed speed curve, the tool tip path curve is interpolated from the i=0th interpolation point, and the i+1th interpolation point of the tool tip path curve is calculated according to the second-order Taylor expansion formula;

It should be noted that after the feed speed curve f(u) is planned, the effective information of the feed speed curve f(u) is transmitted to the control end of the CNC machine tool, and interpolation starts from the 0th interpolation point, that is $u_0=0$. The i+1th interpolation point of the tool tip path curve is calculated according to the second-order Taylor expansion formula:

$$u_{i+1} = u_i + \frac{f(u_i)T_s}{\left\|\frac{dC(u)}{du}\right\|_{u=u_i}} - \frac{f^2(u_i)T_s^2\left(\frac{dC(u)}{du} \cdot \frac{dC^2(u)}{du^2}\right)\big|_{u=u_i}}{2\left\|\frac{dC(u)}{du}\right\|^4_{u=u_i}}$$

Among them, $T_s$ is the interpolation period, $u_{i+1}$ is the i+1th interpolation point of the tool nose path curve, and $u_i$ is the ith interpolation point of the tool tip path curve.

Step 104: The tool tip node vector interval is determined where the i+1th interpolation point of the tool tip path curve falls;

It should be noted that after calculating the i+1th interpolation point of the tool tip path curve $u_{i+1}$, $u_{i+1}$ is determined to belong to which node vector interval among the node vectors $[0, 0, 0, U_1, U_2, U_3, \ldots, U_m, 1, 1, 1]$ of the tool tip path curve, and $u_{i+1} \in [U_k, U_{k+1}]$ is assumed.

Step 105: The first-order derivative vector of the i+1th interpolation point of the tool tip path curve and the first-order derivative vector of the interpolation point corresponding to the left and right endpoints of the tool tip node vector interval are calculated;

It should be noted that the first-order derivative vector of the i+1th interpolation point $u_{i+1}$ of the tool tip path curve and the first-order derivative of the interpolation point corresponding to the left and right endpoints (ie, $U_k$ and $U_{k+1}$) of the vector interval of the tool tip node are calculated according to the following formula:

$$C'(u) = \frac{\sum_{j=0}^n N'_{j,p}(u)w_j P_j - C(u) \cdot \sum_{i=0}^n N'_{j,p}(u)w_j}{\sum_{j=0}^n N_{j,p}(u)w_j}$$

Among them, C'(u) is the first-order derivative curve of the tool tip path curve C(u), $N_{j,p}(u)$ is the B-spline basis function of degree p defined by the node vector of the tool tip path curve, $N_{j,p}'(u)$ is the first-order derivative of $N_{j,p}(u)$, $P_j$ is the jth control point, $w_j$ and is the jth weight coefficient, n is the number of control points.

Therefore, three first-order derivative vectors can be obtained: C'($u_{i+1}$), C'($U_k$), C'($U_{k+1}$).

Step 106: The three first-order derivative vectors are projected onto the X0Y plane and the starting point is moved to the same point. The first angle between the first-order derivative vector at the i+1th interpolated point of the tip path curve and the first order derivative vector at the left end of the vector interval of the tool tip node, and the second angle between the first-order derivative vector at the left end of the vector interval of the tool tip node and the first-order derivative vector at the right end of the vector interval of the tool tip node are calculated respectively in the X0Y plane. The first angle is divided by the second angle to get the angle progress;

It should be noted that the three calculated first-order derivative vectors, that is C'($u_{i+1}$), C'($U_k$), C'($U_{k+1}$), are projected onto the X0Y plane, and the starting point is moved to the same point. The first angle $\theta_1$ between the first-order derivative vector C'($u_{i+1}$) at the i+1th interpolated point of the tip path curve in the X0Y plane and the first order derivative vector C'($U_k$) at the left end of the vector interval of the tool tip node, and the second angle $\theta_2$ between the first-order derivative vector C'($U_k$) at the left end of the vector interval of the tool tip node and the first-order derivative vector C'($U_{k+1}$) at the right end of the vector interval of the tool tip node are calculated respectively in the X0Y plane. The first angle is divided by the second angle to get the angle progress $\eta_1$, that is $$\eta_1 = \frac{\theta_1}{\theta_2},$$

as shown in FIG. 2.

Step 107: The tool axis node vector interval corresponding to the tool tip node vector interval on the tool axis path curve and the first-order derivative vector of the interpolation points corresponding to the left and right endpoints of the tool tip node vector interval are calculated.

It should be noted that the first-order derivative vectors ($C'(V_k)$ and $C'(V_{k+1})$) of the vector interval $[V_k, V_{k+1}]$ of the tool axis node corresponding to the vector interval $[U_k, U_{k+1}]$ of the tool tip node on the tool axis path curve $C(v)$ and the interpolation points corresponding to the left and right endpoints of the vector interval of the tool tip node are calculated.

Step 108: The first-order derivative vector of the i+1th interpolation point of the tool axis path curve is determined according to the angular progress;

It should be noted that after obtaining the $C'(V_k)$ and $C'(V_{k+1})$, the first-order derivative vector $C'(v_{i+1})$ of the i+1th interpolation point of the tool axis path curve can be determined based on the angular progress $$\eta_1 = \frac{\theta_1}{\theta_2}.$$

Step 109: The intersection point of the first-order derivative vector of the i+1th interpolation point of the tool axis path curve and the first-order derivative curve of the tool axis path curve is calculated. The proportional coefficient is calculated according to the preset formula.

It should be noted that according to the formula C'(u) in step 105, the first-order derivative curve $C'(v)$ of the tool axis path curve $C(v)$ can be calculated, and its control points for controlling multiple deformations can be obtained:

$$[C'(0), C'(v_1), C'(v_2), \ldots, C'(v_n), C'(1)].$$

Figure 3:
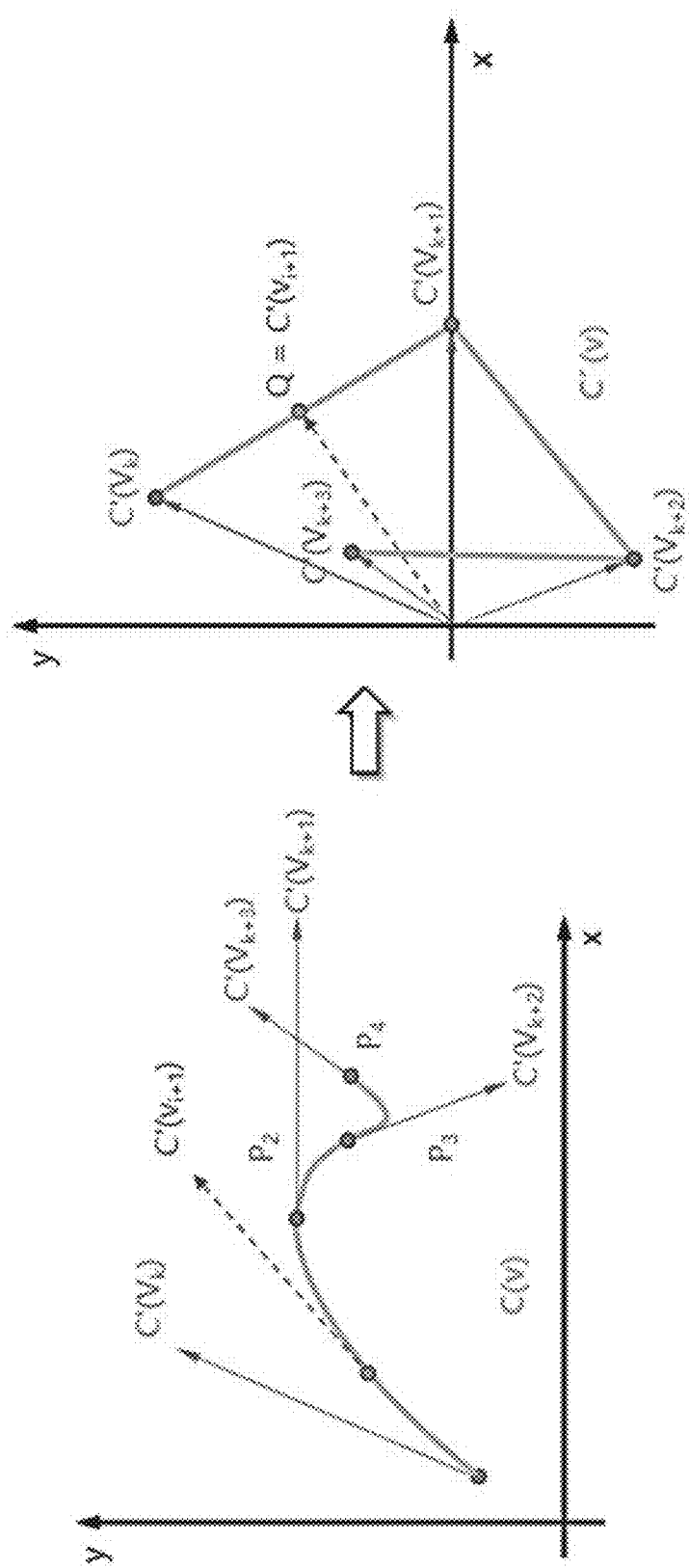
FIG. 3 is a schematic projection diagram of the tool axis path curve and the corresponding first-order derivative curve provided in the embodiment of the present invention.

The first-order derivative vector $C'(v_{i+1})$ of the i+1th interpolation point of the tool axis path curve intersects with the first-order derivative curve $C'(v)$ at point Q, as shown in FIG. 3, Q is located on a straight line $C'(U_k)C'(v_{k+1})$. Therefore, the formula for calculating the proportional coefficient $\eta_2$ is:

$$\eta_2 = \frac{|QC'(V_k)|}{|C'(V_k)C'(V_{k+1})|}$$

Among them, $\eta_2$ is the proportional coefficient, $V_k$ is the left end point of the tool tip node vector interval, $V_{k+1}$ is the right end point of the tool tip node vector interval, Q is the intersection point of the first-order derivative vector of the i+1th interpolation point of the tool axis path curve and the first-order derivative curve of the tool axis path curve, $C'(V_k)$ is the first-order derivative vector of the interpolation point corresponding to the left end point of the vector interval of the tool tip node, and $C'(V_{k+1})$ is the first-order derivative vector of the interpolation point corresponding to the right end point of the vector interval of the tool tip node;

Step 110: The i+1th interpolation point of the tool axis path curve linked to the i+1th interpolation point of the tool tip path curve is calculated based on the proportional coefficient, and the tool axis path curve is interpolated.

It should be noted that the tool axis path curve interpolation parameters $v_{i+1}$ linked to $u_{i+1}$ is calculated based on the proportional coefficient $\eta_2$, and the calculation formula is:

$$v_{i+1} = V_k + \eta_2(V_{k+1} - V_k)$$

Among them, $v_{i+1}$ is the i+1th interpolation point of the tool axis path curve.

After the calculation of the i+1th interpolation point of the tool axis path curve is completed, return to step 103 to start calculating the $i+2^{nd}$ interpolation point of the tool axis path curve, and so on, all the interpolation points of the tool axis path curve can be calculated, and the tool path interpolation is completed.

Figures 4A, 4B:
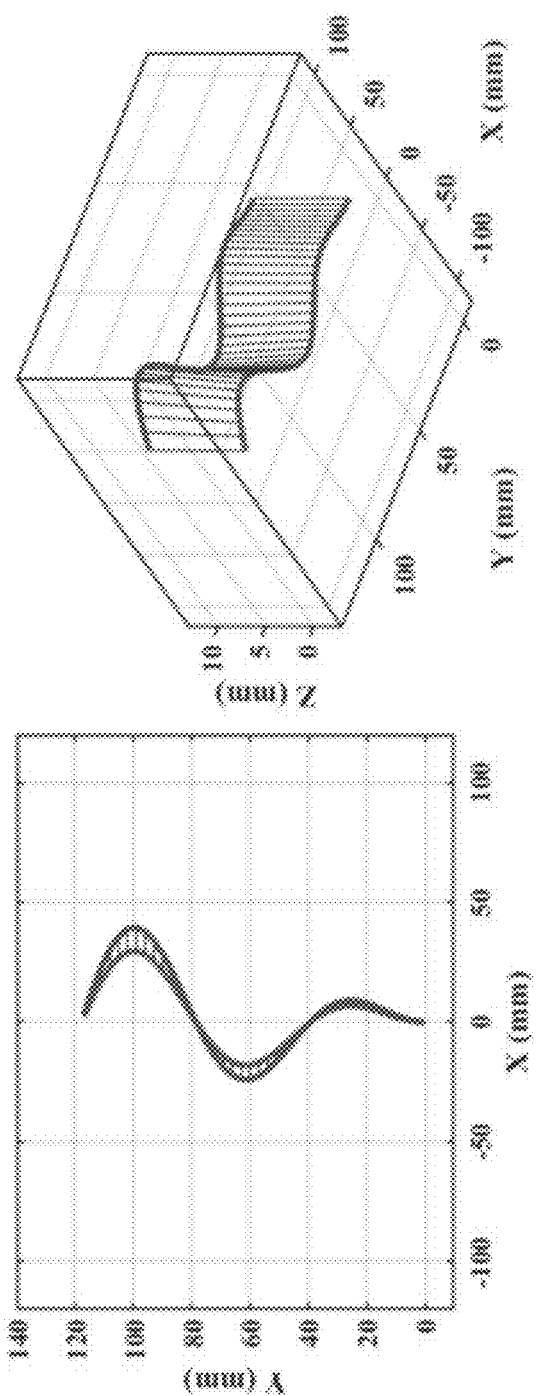
FIG. 4A is a plan view diagram of trajectory after interpolation using the five-axis linkage synchronous tool path interpolation method provided in the embodiment of the present invention.
FIG. 4B is a spatial view diagram of trajectory after interpolation using the five-axis linkage synchronous tool path interpolation method provided in the embodiment of the present invention.
Figure 5A:
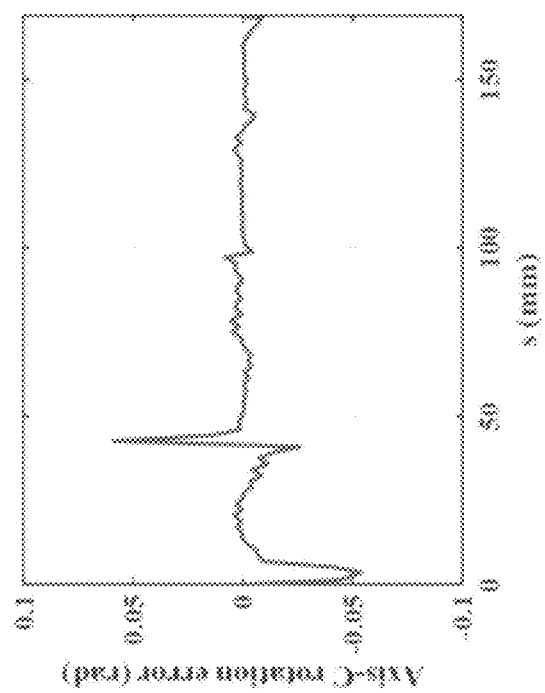
FIG. 5A shows the error existing in the C-axis (one of the five axes of rotation) after interpolation by the interpolation method of the prior, the maximum error is 0.06 rad (i.e., 3.5°)
Figure 5B:
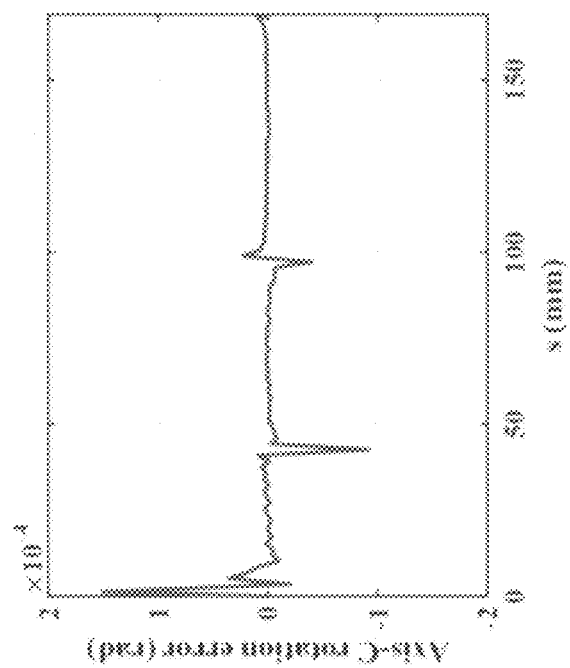
FIG. 5B shows the error existing in the C-axis after interpolation by the interpolation method provided by the embodiment of the present invention.

FIG. 4 is a trajectory diagram after interpolation using the five-axis linkage synchronous tool path interpolation method provided in the embodiment of the present invention (the left side is a plan view and the right side is a spatial view). FIG. 5 is a schematic diagram comparing the effects of the interpolation method in the prior art and the interpolation method provided by the embodiment of the present invention. The left side shows the error existing in the C-axis (one of the five axes of rotation) after interpolation by the interpolation method of the prior art, the maximum error is 0.06 rad (i.e. 3.5°). The right side shows the error existing in the C-axis after interpolation by the interpolation method provided by the embodiment of the present invention. The maximum error is $1.5 \times 10^{-4}$ rad (i.e. 0.0086°). Compared with the prior art, the interpolation method provided by the embodiment of the present invention significantly improves the accuracy of linkage interpolation.

The synchronization process of the existing interval synchronization method depends on the shape of the tool tip curve and the tool axis curve. When the shapes of the two curves are the same, the value of each node in the node vector and the length of the interval are also the same, then it is feasible to calculate $v_{i+1}$, which has the same progress as $u_{i+1}$ and belongs to the interval $[V_k, V_{k+1}]$ according to the progress of $u_{i+1}$ in the interval $[U_k, U_{k+1}]$. When the shapes of the two curves are different, the value of each node in the node vector and the length of the interval are different, and if the calculation is still based on the interval synchronization method, there will be an error. And the greater the difference in shape, the greater the error. The five-axis linkage synchronous tool path interpolation method provided in the embodiment of the present invention does not calculate $v_{i+1}$ from $u_{i+1}$ based on interval synchronization, but utilizes the characteristics of spline curves: the strict proportional relationship between the points, control points and parameters on the first-order derivative curves of all spline curves, that is, the relationship between the proportional coefficients $\eta_2$ of points and control points and parameters is fixed and will not change with the shape of the curve. Therefore, as to the curves with different shapes, the fixed relationship of the first-order derivative curve can be used to calculate $v_{i+1}$ more accurately from $u_{i+1}$, thus avoiding the limitation affected by the shape consistency of the tool tip path curve and the tool axis path curve.

The five-axis linkage synchronous tool path interpolation method provided by the present invention first plans the feed speed curve, calculates the interpolation points of the tool tip path curve based on the second-order Taylor expansion formula, and then calculates the first-order derivative vector of the corresponding interpolation point based on the vector interval of the tool tip node where the interpolation point of the tool tip path curve falls. Thus, the angular progress is calculated, and the first-order derivative vector of the interpolation point of the tool axis path curve is determined based on the angular progress, and the proportional coefficient relationship of the first-order derivative curve of the tool axis path curve is obtained. The method utilizes the strict proportional coefficient relationship between points, control points and parameters on the first-order derivative curve of the spline curve, more accurate tool axis path curve interpolation points from the parameters of the tool tip path curve are calculated. There is no need to calculate the tool axis path curve interpolation points according to interval synchronization. It is not affected by the shape consistency of the tool tip path curve and the tool axis path curve. This avoids the deviation between the actual direction of the tool and the desired direction, and solves the technical problem that the existing five-axis NURBS curve interpolation method is prone to deviations between the actual direction of the tool and the desired direction, resulting in poor contours of the processed parts.

Figure 6:
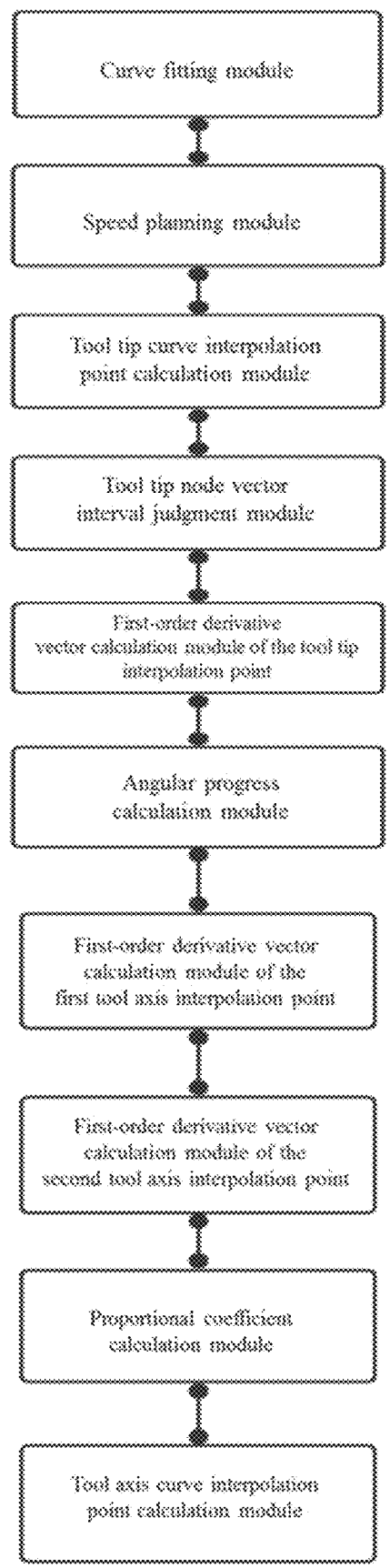
FIG. 6 is a schematic structural diagram of a five-axis linkage synchronous tool path system provided in an embodiment of the present invention.

For ease of understanding, please refer to FIG. 6. The present invention provides an embodiment of a five-axis linkage synchronous tool path interpolation system, which includes:

A curve fitting module is used to fit the tool tip path curve and the tool axis path curve based on the quadratic NURBS curve according to the tool path information respectively, and the node vectors of the tool tip path curve and the tool axis path curve are obtained respectively;

A speed planning module is used to plan the feed speed curve based on the relationship between the constraints of the CNC machine tool and the feed speed;

A tool tip curve interpolation point calculation module is used to interpolate the tool tip path curve from the i=0th interpolation point based on the feed speed curve, and calculate the i+1th interpolation point of the tool tip path curve based on the second-order Taylor expansion formula;

A tool tip node vector interval judgment module is used to judge the tool tip node vector interval where the i+1th interpolation point of the tool tip path curve falls;

A first-order derivative vector calculation module of the tool tip interpolation point is used to calculate the first-order derivative vector of the i+1th interpolation point of the tool tip path curve and the first-order derivative vector of the interpolation point corresponding to the left and right endpoints of the vector interval of the tool tip node;

An angular progress calculation module is used to project three first-order derivative vectors onto the X0Y plane, and move the starting point to the same point. The first angle between the first-order derivative vector at the i+1th interpolated point of the tip path curve in the X0Y plane and the first order derivative vector at the left end of the vector interval of the tool tip node, and the second angle between the first-order derivative vector at the left end of the vector interval of the tool tip node and the first-order derivative vector at the right end of the vector interval of the tool tip node are calculated respectively in the X0Y plane. The first angle is divided by the second angle to get the angle progress;

A first-order derivative vector calculation module of the first tool axis interpolation point is used to calculate the first-order derivatives vector of the vector interval of the tool axis node corresponding to the vector interval of the tool tip node on the tool axis path curve and the interpolation points corresponding to the left and right endpoints of the vector interval of the tool tip node;

A first-order derivative vector calculation module of the second tool axis interpolation point is used to determine the first-order derivative vector of the i+1th interpolation point of the tool axis path curve based on the angular progress;

A proportional coefficient calculation module is used to calculate the intersection point of the first-order derivative vector of the i+1th interpolation point of the tool axis path curve and the first-order derivative curve of the tool axis path curve. The proportional coefficient is calculated according to the preset formula, which is:

$$\eta_2 = \frac{|QC'(V_k)|}{|C'(V_k)C'(V_{k+1})|}$$

Among them, $\eta_2$ is the proportional coefficient, $V_k$ is the left end point of the tool tip node vector interval, $V_{k+1}$ is the right end point of the tool tip node vector interval, Q is the intersection point of the first-order derivative vector of the i+1th interpolation point of the tool axis path curve and the first-order derivative curve of the tool axis path curve, $C'(V_k)$ is the first-order derivative vector of the interpolation point corresponding to the left end point of the vector interval of the tool tip node, and $C'(V_{k+1})$ is the first-order derivative vector of the interpolation point corresponding to the right end point of the vector interval of the tool tip node;

A tool axis curve interpolation point calculation module is used to calculate the i+1th interpolation point of the tool axis path curve linked to the i+1th interpolation point of the tool tip path curve based on the proportional coefficient, and the tool axis path curve is interpolated.

The formula for calculating the first-order derivative vector of the i+1th interpolation point of the tool tip path curve and the first-order derivative vector of the interpolation point corresponding to the left and right endpoints of the vector interval of the tool tip node is:

$$C'(u) = \frac{\sum_{j=0}^{n} N'_{j,p}(u)w_j P_j - C(u) \cdot \sum_{i=0}^{n} N'_{j,p}(u)w_j}{\sum_{j=0}^{n} N_{j,p}(u)w_j}$$

Among them, C'(u) is the first-order derivative curve of the tool tip path curve C(u), $N_{j,p}(u)$ is the B-spline basis function of degree p defined by the node vector of the tool tip path curve, $N'_{j,p}(u)$ is the first-order derivative of $N_{j,p}(u)$, $P_j$ is the jth control point, $w_j$ and is the jth weight coefficient, n is the number of control points.

The calculation formula for calculating the i+1th interpolation point of the tool axis path curve linked to the i+1th interpolation point of the tool tip path curve based on the proportional coefficient is:

$$v_{i+1} = V_k + \eta_2(V_{k+1} - V_k)$$

Among them, $v_{i+1}$ is the i+1th interpolation point of the tool axis path curve.

The sampling point speed constraint is:

$$f_{p,max} = \min\{f_{t,max}, K_1^-(v_{\wedge,max}), K_1^-(K_2^-(v_{\vee,max}))\}$$

Among them, $f_{p,max}$ is the maximum sampling speed, $f_{t,max}$ is the maximum feed speed determined by the performance of the CNC machine tool, $v_{\wedge,max}$ is the maximum speed of the axis, $v_{\vee,max}$ is the maximum speed of the motor, $K_1^-$ is the inverse kinematic transformation from the tool tip to the axis, $K_2^-$ and is the inverse kinematic transformation from the axis to the motor;

The centripetal acceleration constraint is:

$$f_{n,a} = \sqrt{\rho a_{n,max}}$$

Among them, $f_{n,a}$ is the centripetal acceleration, $a_{n,max}$ is the maximum centripetal acceleration, p and is the curvature of the path curve;

The centripetal jerk constraint is:

$$f_{n,j} = \sqrt[3]{\rho^2 j_{n,max}}$$

Among them, $f_{n,j}$ is the centripetal jerk and $j_{n,max}$ is the maximum centripetal jerk;

The chord error constraint is:

$$f_{chrd} = \frac{2}{T_s}\sqrt{\rho^2 - (\rho - \delta_{max})^2}$$

Among them $f_{chrd}$ is the maximum speed constrained by the chord error, $T_s$ is the interpolation period, and $\delta_{max}$ is the maximum chord error;

The contour error constraint is:

$$f_{cntr} = \rho\omega_n\sqrt{1 - 2\xi^2 + \sqrt{(2\xi^2 - 1)^2 - \frac{\varepsilon_{max}^2 - 2\varepsilon_{max}\rho}{(\rho - \varepsilon_{max})^2}}}$$

Among them, $f_{cntr}$ is the maximum speed constrained by the contour error, $\varepsilon_{max}$ is the maximum contour error, $\omega_n$ is the natural frequency of the CNC machine tool system, and $\xi$ is the damping of the CNC machine tool system.

The speed planning module is specifically used for:

According to the relationship between the constraints and feed speed of the CNC machine tool, the maximum feed speed that satisfies the constraints at each sampling point is calculated, where the maximum feed speed that satisfies the constraints at each sampling point is:

$$f(u_i) = \min\{f_{p,max}^i, f_{n,a}^i, f_{n,j}^i, f_{chrd}^i, f_{cntr}^i\}$$

Among them, $f(u_i)$ is the maximum feed speed that satisfies the constraint condition at the ith sampling point, $f^i_{p,max}$ is the maximum sampling speed that satisfies the sampling point speed constraint at the ith sampling point, $f^i_{n,a}$ and is the centripetal acceleration constraint that satisfies the centripetal acceleration constraint at the ith sampling point, $f^i_{n,j}$ is the centripetal acceleration at the ith sampling point that satisfies the centripetal acceleration constraint, $f^i_{chrd}$ is the maximum speed at the ith sampling point that satisfies the chord error constraint, and $f^i_{cntr}$ is the maximum speed at the ith sampling point that satisfies the contour error constraint;

According to the maximum feed speed that satisfies the constraint conditions at all sampling points, polynomial fitting is used to obtain the feed speed curve that satisfies the constraint conditions along the entire curve path.

The five-axis linkage synchronous tool path interpolation system provided by the present invention is used to execute the five-axis linkage synchronous tool path interpolation method provided by the present invention. Its principle and achieved technical effects are the same as those of the five-axis linkage synchronous tool path interpolation method provided by the present invention and will not be repeated here.

As mentioned above, the above embodiments are only used to illustrate the technical solution of the present invention, but not to limit it. Although the present invention has been described in detail with reference to the foregoing embodiments, those of ordinary skill in the art should understand that they can still modify the foregoing. The technical solutions described in each embodiment may be modified, or some of the technical features may be equivalently replaced; however, these modifications or substitutions do not cause the essence of the corresponding technical solutions to deviate from the spirit and scope of the technical solutions of each embodiment of the present invention.

What is claimed is:

1. A five-axis linkage synchronous tool path interpolation method, characterized in that it includes:

according to the tool path information, the tool tip path curve and the tool axis path curve are respectively fitted based on the quadratic NURBS curve, and the node vectors of the tool tip path curve and the tool axis path curve are obtained respectively;

according to the relationship between the constraints of the CNC machine tool and the feed speed, the feed speed curve is planned; the constraints of the CNC machine tool include sampling point speed constraints, centripetal acceleration constraints, centripetal jerk constraints, chord error constraints and contour error constraints;

according to the feed speed curve, the tool tip path curve is interpolated from the i=0th interpolation point, and the i+1th interpolation point of the tool tip path curve is calculated according to the second-order Taylor expansion formula;

the tool tip node vector interval is determined where the i+1th interpolation point of the tool tip path curve falls;

the first-order derivative vector of the i+1th interpolation point of the tool tip path curve and the first-order derivative vector of the interpolation point corresponding to the left and right endpoints of the tool tip node vector interval are calculated;

the three first-order derivative vectors are projected onto the X0Y plane and the starting point is moved to the same point; the first angle between the first-order derivative vector at the i+1th interpolated point of the tip path curve and the first order derivative vector at the left end of the vector interval of the tool tip node, and the second angle between the first-order derivative vector at the left end of the vector interval of the tool tip node and the first-order derivative vector at the right end of the vector interval of the tool tip node are calculated respectively in the X0Y plane; the first angle is divided by the second angle to get the angle progress;

the first angle between the first-order derivative vector at the i+1th interpolated point of the tip path curve and the first order derivative vector at the left end of the vector interval of the tool tip node, and the second angle between the first-order derivative vector at the left end of the vector interval of the tool tip node and the first-order derivative vector at the right end of the vector interval of the tool tip node are calculated respectively in the X0Y plane;

the tool axis node vector interval corresponding to the tool tip node vector interval on the tool axis path curve and the first-order derivative vector of the interpolation points corresponding to the left and right endpoints of the tool tip node vector interval are calculated;

the first-order derivative vector of the i+1th interpolation point of the tool axis path curve is determined according to the angular progress;

the intersection point of the first-order derivative vector of the i+1th interpolation point of the tool axis path curve and the first-order derivative curve of the tool axis path curve is calculated; the proportional coefficient is calculated according to the preset formula, which is:

$$\eta_2 = \frac{|QC'(V_k)|}{|C'(V_k)C'(V_{k+1})|}$$

among them, $\eta_2$ is the proportional coefficient, $V_k$ is the left end point of the tool tip node vector interval, $V_{k+1}$ is the right end point of the tool tip node vector interval, Q is the intersection point of the first-order derivative vector of the i+1th interpolation point of the tool axis path curve and the first-order derivative curve of the tool axis path curve, $C'(V_k)$ is the first-order derivative vector of the interpolation point corresponding to the left end point of the vector interval of the tool tip node, and $C'(V_{k+1})$ is the first-order derivative vector of the interpolation point corresponding to the right end point of the vector interval of the tool tip node;

the i+1th interpolation point of the tool axis path curve linked to the i+1th interpolation point of the tool tip path curve is calculated based on the proportional coefficient, and the tool axis path curve is interpolated;

the calculation formula for calculating the i+1th interpolation point of the tool axis path curve linked to the i+1th interpolation point of the tool tip path curve based on the proportional coefficient is:

$$v_{i+1} = V_k + \eta_2(V_{k+1} - V_k)$$

among them, $v_{i+1}$ is the i+1th interpolation point of the tool axis path curve.

2. The five-axis linkage synchronous tool path interpolation method according to claim 1, characterized in that the formula for calculating the first-order derivative vector of the i+1th interpolation point of the tool tip path curve and the first-order derivative vector of the interpolation point corresponding to the left and right endpoints of the vector interval of the tool tip node is:

$$C'(u) = \frac{\sum_{j=0}^{n} N'_{j,p}(u) w_j P_j - C(u) \cdot \sum_{j=0}^{n} N'_{j,p}(u) w_j}{\sum_{j=0}^{n} N_{j,p}(u) w_j}$$

among them, $C'(u)$ is the first-order derivative curve of the tool tip path curve $C(u)$, $N_{j,p}(u)$ is the B-spline basis function of degree p defined by the node vector of the tool tip path curve, $N_{j,p}'(u)$ is the first-order derivative of $N_{j,p}(u)$, $P_j$ is the jth control point, $w_j$ and is the jth weight coefficient, n is the number of control points.

3. The five-axis linkage synchronous tool path interpolation method according to claim 1, characterized in that the sampling point speed constraint is:

$$f_{p,max} = \min\{f_{t,max}, K_1^-(v_{\wedge,max}), K_1^-(K_2^-(v_{\vee,max}))\}$$

among them, $f_{p,max}$ is the maximum sampling speed, $f_{t,max}$ is the maximum feed speed determined by the performance of the CNC machine tool, $v_{\wedge,max}$ is the maximum speed of the axis, $v_{\vee,max}$ is the maximum speed of the motor, $K_1^-$ is the inverse kinematic transformation from the tool tip t to the axis, $K_2^-$ and is the inverse kinematic transformation from the axis to the motor;

the centripetal acceleration constraint is:

$$f_{n,a} = \sqrt{\rho a_{n,max}}$$

among them, $f_{n,a}$ is the centripetal acceleration, $a_{n,max}$ is the maximum centripetal acceleration, $\rho$ is the curvature of the path curve;

the centripetal jerk constraint is:

$$f_{n,j} = \sqrt[3]{\rho^2 j_{n,max}}$$

among them, $f_{n,j}$ is the centripetal jerk and $j_{n,max}$ is the maximum centripetal jerk;

the chord error constraint is:

$$f_{chrd} = \frac{2}{T_s} \sqrt{\rho^2 - (\rho - \delta_{max})^2}$$

among them $f_{chrd}$ is the maximum speed constrained by the chord error, $T_s$ is the interpolation period, and $\delta_{max}$ is the maximum chord error;

the contour error constraint is:

$$f_{cntr} = \rho \omega_n \sqrt{1 - 2\xi^2 + \sqrt{(2\xi^2 - 1)^2 - \frac{\varepsilon_{max}^2 - 2\varepsilon_{max}\rho}{(\rho - \varepsilon_{max})^2}}}$$

among them, $f_{cntr}$ is the maximum speed constrained by the contour error, $\varepsilon_{max}$ is the maximum contour error, $\omega_n$ is the natural frequency of the CNC machine tool system, and $\xi$ is the damping of the CNC machine tool system.

4. The five-axis linkage synchronous tool path interpolation method according to claim 3, characterized in that according to the relationship between the constraints of the CNC machine tool and the feed speed, the feed speed curve is planned, which includes:

according to the relationship between the constraints and feed speed of the CNC machine tool, the maximum feed speed that satisfies the constraints at each sampling point is calculated, where the maximum feed speed that satisfies the constraints at each sampling point is:

$$f(u_i) = \min\{f_{p,max}{}^i, f_{n,a}{}^i, f_{n,j}{}^i, f_{chrd}{}^i, f_{cntr}{}^i\}$$

among them, $f(u_i)$ is the maximum feed speed that satisfies the constraint condition at the ith sampling point, $f^i_{p,max}$ is the maximum sampling speed that satisfies the sampling point speed constraint at the ith sampling point, $f^i_{n,a}$ is the centripetal acceleration that satisfies the centripetal acceleration constraint at the ith sampling point, $f^i_{n,j}$ is the centripetal jerk that satisfies the centripetal jerk constraint at the ith sampling point, $f^i_{chrd}$ is the maximum speed at the ith sampling point that satisfies the chord error constraint, and $f^i_{cntr}$ is the maximum speed at the ith sampling point that satisfies the contour error constraint;

according to the maximum feed speed that satisfies the constraint conditions at all sampling points, polynomial fitting is used to obtain the feed speed curve that satisfies the constraint conditions along the entire curve path.

5. A five-axis linkage synchronous tool path interpolation system, characterized in that it includes:

a curve fitting module is used to fit the tool tip path curve and the tool axis path curve based on the quadratic NURBS curve according to the tool path information respectively, and the node vectors of the tool tip path curve and the tool axis path curve are obtained respectively;

a speed planning module is used to plan the feed speed curve based on the relationship between the constraints of the CNC machine tool and the feed speed; the constraints of the CNC machine tool include sampling point speed constraints, centripetal acceleration constraints, centripetal jerk constraints, chord error constraints and contour error constraints;

a tool tip curve interpolation point calculation module is used to interpolate the tool tip path curve from the i=0th interpolation point based on the feed speed curve, and calculate the i+1th interpolation point of the tool tip path curve based on the second-order Taylor expansion formula;

a tool tip node vector interval judgment module is used to judge the tool tip node vector interval where the i+1th interpolation point of the tool tip path curve falls;

a first-order derivative vector calculation module of the tool tip interpolation point is used to calculate the first-order derivative vector of the i+1th interpolation point of the tool tip path curve and the first-order derivative vector of the interpolation point corresponding to the left and right endpoints of the vector interval of the tool tip node;

an angular progress calculation module is used to project three first-order derivative vectors onto the X0Y plane, and move the starting point to the same point, The three first-order derivative vectors are projected onto the X0Y plane and the starting point is moved to the same point; the first angle between the first-order derivative vector at the i+1th interpolated point of the tip path curve and the first order derivative vector at the left end of the vector interval of the tool tip node, and the second angle between the first-order derivative vector at the left end of the vector interval of the tool tip node and the first-order derivative vector at the right end of the vector interval of the tool tip node are calculated respectively in the X0Y plane; the first angle is divided by the second angle to get the angle progress;

a first-order derivative vector calculation module of the first tool axis interpolation point is used to calculate the vector interval of the tool axis node corresponding to the vector interval of the tool tip node on the tool axis path curve and the first-order derivatives vector of the interpolation points corresponding to the left and right endpoints of the vector interval of the tool tip node;

a first-order derivative vector calculation module of the second tool axis interpolation point is used to determine the first-order derivative vector of the i+1th interpolation point of the tool axis path curve based on the angular progress;

a proportional coefficient calculation module is used to calculate the intersection point of the first-order derivative vector of the i+1th interpolation point of the tool axis path curve and the first-order derivative curve of the tool axis path curve; the proportional coefficient is calculated according to the preset formula, which is:

$$\eta_2 = \frac{|QC'(V_k)|}{|C'(V_k)C'(V_{k+1})|}$$

among them, $\eta_2$ is the proportional coefficient, $V_k$ is the left end point of the tool tip node vector interval, $V_{k+1}$ is the right end point of the tool tip node vector interval, Q is the intersection point of the first-order derivative vector of the i+1th interpolation point of the tool axis path curve and the first-order derivative curve of the tool axis path curve, $C'(V_k)$ is the first-order derivative vector of the interpolation point corresponding to the left end point of the vector interval of the tool tip node, and $C'(V_{k+1})$ is the first-order derivative vector of the interpolation point corresponding to the right end point of the vector interval of the tool tip node;

a tool axis curve interpolation point calculation module is used to calculate the i+1th interpolation point of the tool axis path curve linked to the i+1th interpolation point of the tool tip path curve based on the proportional coefficient, and the tool axis path curve is interpolated; the calculation formula for calculating the i+1th interpolation point of the tool axis path curve linked to the i+1th interpolation point of the tool tip path curve based on the proportional coefficient is:

$$v_{i+1}=V_k+\eta_2(V_{k+1}-V_k)$$

among them, $v_{i+1}$ is the i+1th interpolation point of the tool axis path curve.

6. The five-axis linkage synchronous tool path interpolation system according to claim 5, characterized in that the formula for calculating the derivative the first-order vector of i+1th interpolation point of the tool tip path curve and the first-order derivative vector of the interpolation point corresponding to the left and right endpoints of the vector interval of the tool tip node is:

$$C'(u) = \frac{\sum_{j=0}^{n}N'_{j,p}(u)w_jP_j - C(u)\cdot\sum_{i=0}^{n}N'_{j,p}(u)w_j}{\sum_{j=0}^{n}N_{j,p}(u)w_j}$$

among them, C'(u) is the first-order derivative curve of the tool tip path curve C(u), $N_{j,p}(u)$ is the B-spline basis function of degree p defined by the node vector of the tool tip path curve, $N_{j,p}'(u)$ is the first-order derivative of $N_{j,p}(u)$, $P_j$ is the jth control point, $w_j$ and is the jth weight coefficient, n is the number of control points.

7. The five-axis linkage synchronous tool path interpolation system according to claim 5, characterized in that the constraints of the CNC machine tool include sampling point speed constraints, centripetal acceleration constraints, centripetal jerk constraints, chord error constraints and contour error constraints;

the sampling point speed constraint is:

$$f_{p,max}=\min\{f_{t,max},K_1^-(v_{\wedge,max}),K_1^-(K_2^-(v_{\vee,max}))\}$$

among them, $f_{p,max}$ is the maximum sampling speed, $f_{t,max}$ is the maximum feed speed determined by the performance of the CNC machine tool, $v_{\wedge,max}$ is the maximum speed of the axis, $v_{\vee,max}$ is the maximum speed of the motor, $K_1^-$ is the inverse kinematic transformation from the tool tip to the axis, $K_2^-$ and is the inverse kinematic transformation from the axis to the motor;

the centripetal acceleration constraint is:

$$f_{n,a}=\sqrt{\rho a_{n,max}}$$

among them, $f_{n,a}$ is the centripetal acceleration, $a_{n,max}$ is the maximum centripetal acceleration, $\rho$ and is the curvature of the path curve;

the centripetal jerk constraint is:

$$f_{n,j} = \sqrt{\rho^2 j_{n,max}}$$

among them, $f_{n,j}$ is the centripetal jerk and $j_{n,max}$ is the maximum centripetal jerk;
the chord error constraint is:

$$f_{chrd} = \frac{2}{T_s}\sqrt{\rho^2 - (\rho - \delta_{max})^2}$$

among them $f_{chrd}$ is the maximum speed constrained by the chord error, $T_s$ is the interpolation period, and $\delta_{max}$ is the maximum chord error;
the contour error constraint is:

$$f_{cntr} = \rho\omega_n\sqrt{1 - 2\xi^2 + \sqrt{(2\xi^2 - 1)^2 - \frac{\varepsilon_{max}^2 - 2\varepsilon_{max}\rho}{(\rho - \varepsilon_{max})^2}}}$$

among them, $f_{cntr}$ is the maximum speed constrained by the contour error, $\varepsilon_{max}$ is the maximum contour error, $\omega_n$ is the natural frequency of the CNC machine tool system, and $\xi$ is the damping of the CNC machine tool system.

8. The five-axis linkage synchronous tool path interpolation system according to claim 7, characterized in that the speed planning module is specifically used for:

according to the relationship between the constraints and feed speed of the CNC machine tool, the maximum feed speed that satisfies the constraints at each sampling point is calculated, where the maximum feed speed that satisfies the constraints at each sampling point is:

$$f(u_i) = \min\{f_{p,max}^i, f_{n,a}^i, f_{n,j}^i, f_{chrd}^i, f_{cntr}^i\}$$

among them, $f(u_i)$ is the maximum feed speed that satisfies the constraint condition at the ith sampling point, $f_{p,max}^i$ is the maximum sampling speed that satisfies the sampling point speed constraint at the ith sampling point, $f_{n,a}^i$ and is the centripetal acceleration constraint that satisfies the centripetal acceleration constraint at the ith sampling point, $f_{n,j}^i$ is the centripetal acceleration at the ith sampling point that satisfies the centripetal acceleration constraint, $f_{chrd}^i$ is the maximum speed at the ith sampling point that satisfies the chord error constraint, and $f_{cntr}^i$ is the maximum speed at the ith sampling point that satisfies the contour error constraint;

according to the maximum feed speed that satisfies the constraint conditions at all sampling points, polynomial fitting is used to obtain the feed speed curve that satisfies the constraint conditions along the entire curve path.

\* \* \* \* \*